US012637901B2

(12) United States Patent
Zou et al.

(10) Patent No.: US 12,637,901 B2

(45) Date of Patent: May 26, 2026

(54) FOLDABLE WALL SYSTEMS

(71) Applicant: A&C Future Inc., Newport Beach, CA (US)

(72) Inventors: Keguan Zou, Irvine, CA (US); Han Qin, Newport Beach, CA (US); Zhuangboyu Zhou, Santa Ana, CA (US); Jiuqi Wang, Tustin, CA (US); Sichen Li, Irvine, CA (US); Jiayang Qin, Newport Beach, CA (US)

(73) Assignee: A&C Future Inc., Irvine, CA (US)

( * ) Notice: Subject to any disclaimer, the term of this patent is extended or adjusted under 35 U.S.C. 154(b) by 435 days.

(21) Appl. No.: 17/739,130

(22) Filed: May 8, 2022

(65) Prior Publication Data

US 2023/0358096 A1 Nov. 9, 2023

(51) Int. Cl.

*E04B 1/346* (2006.01)
*E04B 1/343* (2006.01)
*E06B 9/06* (2006.01)

(52) U.S. Cl.

CPC ........ *E06B 9/0638* (2013.01); *E04B 1/34363* (2013.01); *E06B 9/0676* (2013.01)

(58) Field of Classification Search

CPC ... E06B 9/0638; E06B 9/0676; E04B 1/34363
See application file for complete search history.

(56) References Cited

U.S. PATENT DOCUMENTS

| | | | | | |
|---|---|---|---|---|---|
| 1,815,749 | A | * | 7/1931 | Frazer | E05D 15/24 160/201 |
| 2,008,959 | A | * | 7/1935 | Johnson | E05D 15/244 160/209 |
| 2,700,420 | A | * | 1/1955 | Mahlitz | E05D 13/145 160/190 |
| 3,311,159 | A | * | 3/1967 | Stansberry | E05F 15/686 160/189 |
| 4,754,795 | A | * | 7/1988 | Garrod | E06B 9/08 160/133 |
| 5,152,332 | A | | 10/1992 | Siener | |
| 5,230,123 | A | | 7/1993 | Williams | |
| 5,495,640 | A | * | 3/1996 | Mullet | E06B 3/485 16/97 |
| 5,836,499 | A | * | 11/1998 | Mullet | E06B 3/485 226/182 |
| 6,263,942 | B1 | | 7/2001 | Miller | |
| 6,286,258 | B1 | | 9/2001 | Bischof et al. | |
| 8,601,749 | B2 | | 12/2013 | Heune | |
| 8,627,621 | B2 | | 1/2014 | Liebscher | |

(Continued)

FOREIGN PATENT DOCUMENTS

| | | |
|---|---|---|
| CN | 111867362 | 10/2020 |
| EP | 3872289 | 9/2021 |

*Primary Examiner* — Basil S Katcheves

(74) *Attorney, Agent, or Firm* — Joseph A. Andelin; Fish IP Law, LLP

(57) ABSTRACT

Foldable wall systems that greatly reduce traditional wall building processes are contemplated. Suitable foldable wall systems comprise a plurality of panels that form a wall. The panels can be stored or deployed from a housing that is mounted on one or more vertical columns. It is contemplated that the panels comprise one or more track elements that travel within one or more tracks to guide the panels between the stored and deployed configurations.

20 Claims, 6 Drawing Sheets

(56) References Cited

U.S. PATENT DOCUMENTS

| | | | | |
|---|---|---|---|---|
| 10,113,360 | B2 | 10/2018 | Hall | |
| 10,465,383 | B2 | 11/2019 | Dickson | |
| 2002/0184824 | A1 * | 12/2002 | McCartney | E05D 13/00 49/322 |
| 2002/0190678 | A1 * | 12/2002 | Huber | E06B 9/32 318/434 |
| 2007/0256798 | A1 * | 11/2007 | Aquilina | E05D 15/165 160/201 |
| 2009/0183842 | A1 * | 7/2009 | DeCola | E06B 3/485 160/209 |
| 2012/0125545 | A1 * | 5/2012 | Ehrlich | E05D 15/165 160/229.1 |
| 2012/0234507 | A1 * | 9/2012 | Rauch | E05D 13/1292 29/426.1 |
| 2016/0145926 | A1 * | 5/2016 | Jankovsky | E05F 15/668 49/506 |
| 2019/0153774 | A1 * | 5/2019 | Balay | E06B 9/0676 |
| 2019/0263228 | A1 * | 8/2019 | Zeng | E06B 9/58 |
| 2019/0316399 | A1 * | 10/2019 | Sauve | E05F 15/681 |
| 2020/0199931 | A1 * | 6/2020 | Hübner | E05F 15/673 |
| 2020/0399895 | A1 | 12/2020 | Hall | |

* cited by examiner

FOLDABLE WALL SYSTEMS

FIELD OF THE INVENTION

The field of the invention is collapsible or foldable wall systems.

BACKGROUND

The background description includes information that may be useful in understanding the present invention. It is not an admission that any of the information provided herein is prior art or relevant to the presently claimed invention, or that any publication specifically or implicitly referenced is prior art.

These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

Collapsible wall systems have been used to divide or enclose a space. For example, collapsible wall systems are described in U.S. Pat. No. 5,230,123 (Williams, et at.) and U.S. Patent Publication No. 2020/0399895 (Hall, et al.). In each of these systems, a track system is used to transport panels to a stacked position to thereby form a wall. Although collapsible wall systems exist, there is still a need for improved collapsible wall systems.

SUMMARY OF THE INVENTION

The inventive subject matter provides apparatus, systems, and methods in which a foldable wall system can be used to reduce costs and time frames in the construction of a building or a portion of a building. The inventors have developed foldable wall systems that simplifies the process of constructing a frame for a building. As a result, the typical time frame (about 6-8 weeks) to develop a frame is reduced, which also reduces labor costs.

A contemplated foldable wall system comprises first and second tracks, and first and second panels having track elements that travel along the first and second tracks. The system further comprises a bottom support coupled to a cable. The bottom support can be raised by the cable to thereby abut the first or second panel and apply a force that causes the first and second panels to move in a first direction along the first and second tracks. Additionally, the bottom support can be lowered by the cable, such that the first or second panel abuts the bottom support and the first and second panels are carefully allowed to move in a second direction along the first and second tracks. The first and second panels can be moved in the second direction to vertically stack on one another to form a wall or a portion of a wall. Conversely, the wall or the portion of the wall can be collapsed or folded into a housing when the first and second panels are moved in the first direction.

It is contemplated that the foldable wall system comprises a housing that can be mounted on first and second vertical columns. The first track can be disposed on the first vertical column and a first inside wall of the housing, and the second track can be disposed on the second vertical column and a second inside wall of the housing. In such embodiments, the first and second panels comprise a set of wheels that travel along the first and second tracks into (i) a stored position within the housing in the first direction, and (ii) a vertically stacked position in the second direction. It should be appreciated that folding the wall into panels that are stored in a housing simplifies transport of the entire foldable wall system between a manufacturing facility and the installation site.

The transition between a stored/retracted state and a vertically stacked or deployed state can be assisted by use of a motor. It is contemplated that a cable is coupled to a rotating shaft of the motor to thereby raise and lower the cable, which in turn raises and lowers the bottom support. Multiple cables can be coupled to the bottom support and motor as needed to support the panels that form the wall or wall portion.

Various objects, features, aspects and advantages of the inventive subject matter will become more apparent from the following detailed description of preferred embodiments, along with the accompanying drawing figures in which like numerals represent like components.

DETAILED DESCRIPTION

The following discussion provides example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Also, as used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

The inventors have discovered a foldable wall system in which a wall or a portion of a wall can be folded into a housing. It is contemplated that the wall can be composed of panels that that slide out of the housing and vertically stack to thereby form the wall. The panels can comprise wheels that move within tracks disposed on the housing and vertical columns on which the housing is mounted. A bottom support beneath the bottom panel can be raised or lowered to move the panels between stored and deployed positions. The bottom support can be coupled to one or more cables attached to a motor that provides power to raise and lower the bottom support.

Figure 1:
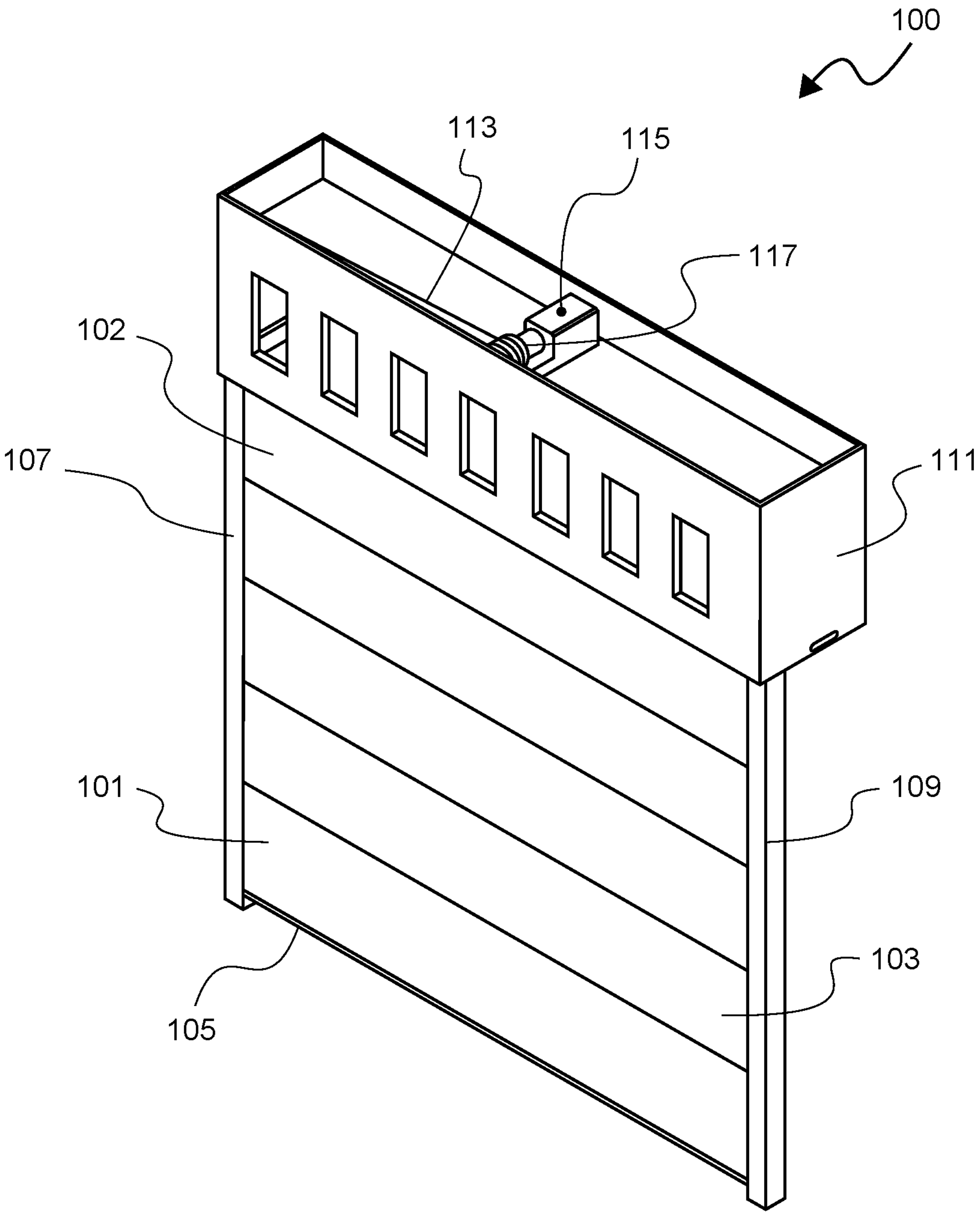
FIG. 1 is a perspective view of an embodiment of a foldable wall system.

FIG. 1 shows an embodiment of a foldable wall system 100. Foldable wall system 100 comprises a housing 111 mounted on a first vertical column 107 and a second vertical column 109. A wall is formed by a plurality of panels that are vertically stacked, which include a bottom panel 101, a middle panel 103, and a top panel 102. A bottom support 105 is located beneath bottom panel 101. Bottom support 105 can be raised to collapse or fold wall into housing 111. In such configuration, the plurality of panels are horizontally stacked within housing 111. From this stored configuration, bottom support 105 can be lowered to deploy the plurality of panels to form the wall. It is contemplated that the plurality of panels (1) travel along tracks that orient the panels to vertically stack to form the wall when fully deployed as shown in FIG. 1, and (2) travel along tracks in an opposite direction to store the plurality of panels in a horizontally stacked configuration within housing 111.

As bottom support 105 is raised, it pushes against bottom panel 101, which pushes against middle panel 103, which pushes against the panel directly above middle panel 103, and so forth to raise the plurality of panels into housing 111. It is contemplated that the tracks are angled within housing, such that the plurality of panels are biased to fall or lower due to gravity to the vertically stacked position shown in FIG. 1. However, bottom support 105 acts as a platform to carefully lower the panels as the plurality of panels are lowered from housing 111.

Bottom support 105 can be coupled to a cable 113 that raises and lowers bottom support 105. It is contemplated that cable 113 is coupled to a motor 115, which provides power to lift or lower bottom support 105. For example, cable 113 can be coupled to a rotating shaft 117 of motor 115 that (1) rotates in one direction to retract cable 113 and thereby lift bottom support 105 and (2) rotates in an opposite direction to deploy cable 113 and thereby lower bottom support 105.

It should be appreciated that a wall that collapses or folds into a housing (e.g., housing 111) simplifies transportation from its place of manufacture and simplifies installation of such wall at the site in which it is to be installed. One or more columns (e.g., first and second vertical columns 107 and 109) can be first installed at a desired site. The housing containing panels that form the wall can be mounted onto the one or more columns. Thereafter, a user can simply turn on a motor (e.g., motor 115) to deploy the panels from the housing to form the wall. It is contemplated that the front of the wall is flush with the front of the one or more columns.

As shown in FIG. 1, foldable wall system 100 comprises housing 111, first and second vertical columns 107 and 109, a plurality of panels (five panels in FIG. 1), bottom support 105, motor 115, and cable 113. As will be discussed in further detail below, foldable wall system 100 also comprises one or more tracks that guide the plurality of panels from a stored configuration to a deployed configuration. The one or more tracks can be grooves that run along (i) first and second vertical columns 107 and 109 and (ii) inside sidewalls of housing 111. The panels can comprise one or more track elements (e.g., wheels) that travel within one or more tracks.

As discussed above, bottom support 105 can be coupled to cable 113. It is contemplated that foldable wall system 100 can comprise additional cables coupled to motor 115 and bottom support 105. For example, one or more cables can connect to one end of bottom support 105, one or more cables can connect to an opposite end of bottom support 105, and all such cables can couple motor 115. One or more pulleys can be used to change the direction of the one or more cables from horizontal in which the one or cables couple to motor 115 to vertical in which the one or more cables couple bottom support 105.

The one or more cables can couple to rotating shaft 117 of motor 115, which is used to roll up the one or more cables connected with bottom support 105. In embodiments where one or more cables are connected to opposite ends of bottom support 105, it is contemplated that the one or more cables will retract at the same time so that bottom support 105 is level (i.e., horizontal) while being raised. As discussed above, it is contemplated that bottom support 105 will push the plurality of panels into housing 111. Furthermore, bottom support 111 will support the plurality of panels from free-falling out of housing 111. Rotating shaft 117 can spin to allow bottom support 105 to carefully lower the plurality of panels from housing 111 in a safe manner.

Figure 2A:
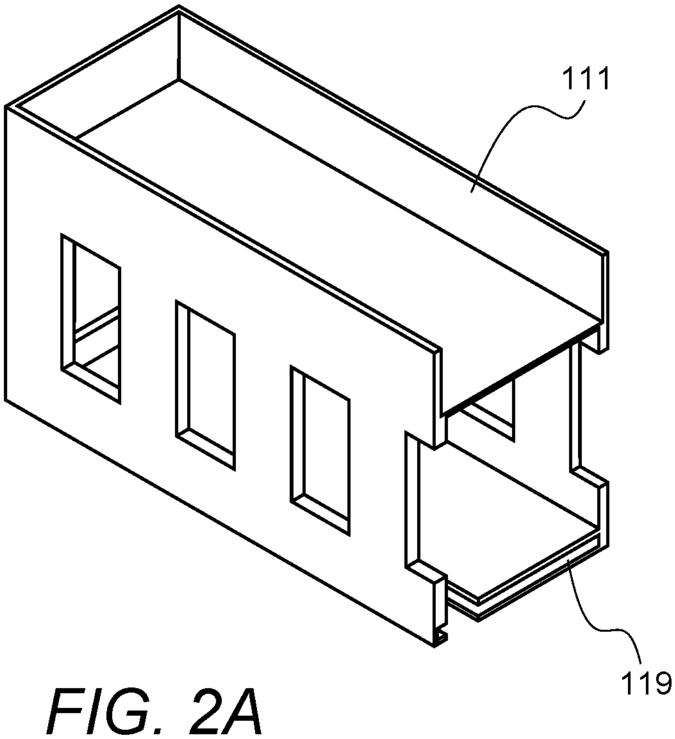
FIG. 2A is a cutaway view of the housing of the foldable wall system of FIG. 1.
Figure 2B:
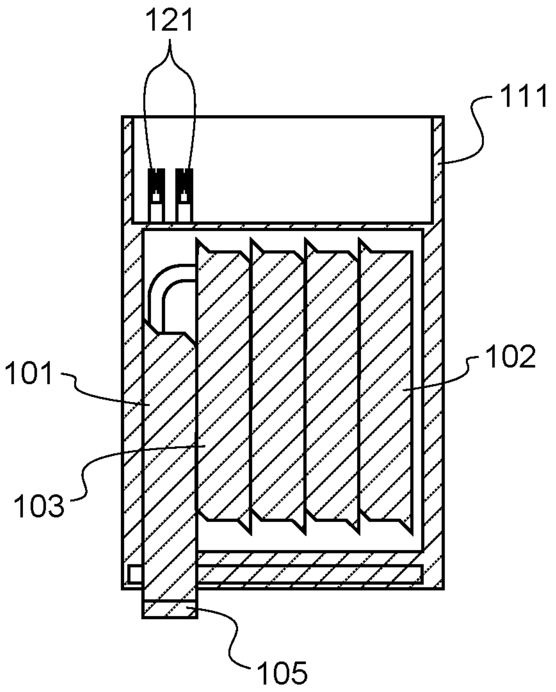
FIG. 2B is another cutaway view of the housing of FIG. 2A.
Figure 2C:
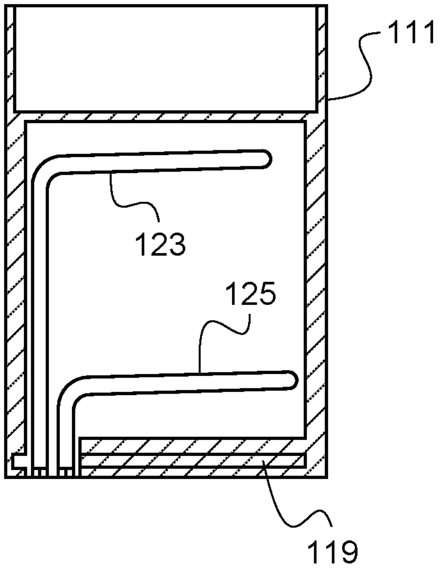
FIG. 2C is another cutaway view of the housing of FIG. 2A.

Housing 111 can be viewed in more detail in the cutaway views provided in FIGS. 2A-2C. Housing 111 is sized and dimensioned to receive the plurality of panels. It is contemplated that a baffle 119 can be used to enclose the interior space of housing 111. As discussed above, the plurality of panels can be stored within housing 111. Except for top panel 102 and bottom panel 101, the front and back sides of the plurality of panels abut one another to horizontally stack within housing as shown in FIG. 2B.

Top panel 102 is closest to the rear end within housing 111 and abuts a back side of an adjacent panel as shown in FIG. 2B. Bottom panel 101 is closest to a front end within housing 111 and abuts a front side of middle panel 103. The plurality of panels follow one or more tracks that guide the panels within housing 111 for storage or out of housing 111 to form the wall. It is contemplated that a first portion of a first track 123 and a first portion of a second track 125 guide the plurality of panels in and out of housing 111. First portions of the first and second tracks 123 and 125 can be disposed on a first inside sidewall of housing 111 as shown in FIG. 2C.

First portions of first and second tracks 123 and 125 can be slots in which first and second track elements (e.g., wheels) of the plurality of panels travel to guide the panels in and out of housing 111. As shown in FIG. 2C, first portions of first and second tracks 123 and 125 comprise an uppercase gamma (Γ) shape. It is contemplated that the horizontal portion of first portions of first and second tracks 123 and 125 is slightly angled, such that the plurality of panels can freely slide out of housing 111 due to gravity. First portions of first and second tracks 123 and 125 are disposed on a sidewall of housing 111 as shown in FIG. 2C. It is contemplated that first portions of third and fourth tracks having the same shape can be disposed on an opposite inside sidewall of housing 111. The first portions of third and fourth tracks can be slots in which third and fourth track elements (e.g., wheels) of the plurality of panels travel to guide the panels in and out of housing 111.

It should be appreciated that the shape of first portions of the tracks within housing 111 (e.g., first portions of first and second tracks 123 and 125) ensures that the plurality panels are vertical while moving up or moving down the tracks. This vertical orientation of the plurality of panels is shown in FIG. 2B as they are horizontally stacked. As discussed above, first portions of the tracks within housing 111 have an inclined angle that facilitates the movement of plurality of panels out of housing 111 due to gravity. Thus, no additional force is needed to push or deploy the plurality of panels out of housing 111. The rate at which the plurality of panels is deployed is controlled by the movement of bottom support 105, which is controlled by one or more cables attached to motor 113.

Housing 111 has an inside height and inside length larger than the heights and lengths of each of the plurality of panels. The depth of the inside of housing 111 (i.e., inside length from front wall to rear wall of housing 111 shown in FIGS. 2B-2C) is larger than the combined thicknesses of each of the plurality of panels (e.g., at least larger than the thickness of five panels as shown in FIG. 2B). The inside dimensions of housing 111 can be modified as required by the dimensions of the plurality of panels, and the overall shape of housing 111 can be modified as required by the structure of the building in which the foldable wall is to be incorporated.

As discussed above, one or more pulleys can be used to change the direction of the one or more cables from horizontal in which the one or cables couple to motor 115 to vertical in which the one or more cables couple bottom support 105. FIG. 2B shows pulleys 121 disposed on a top surface of housing 111. Pulleys 121 reorient one or more cables (e.g., cable 113) to turn vertically through housing 111 (e.g., an opening of housing 111) and into first column 107 where it couples bottom support 105.

Figure 3A:
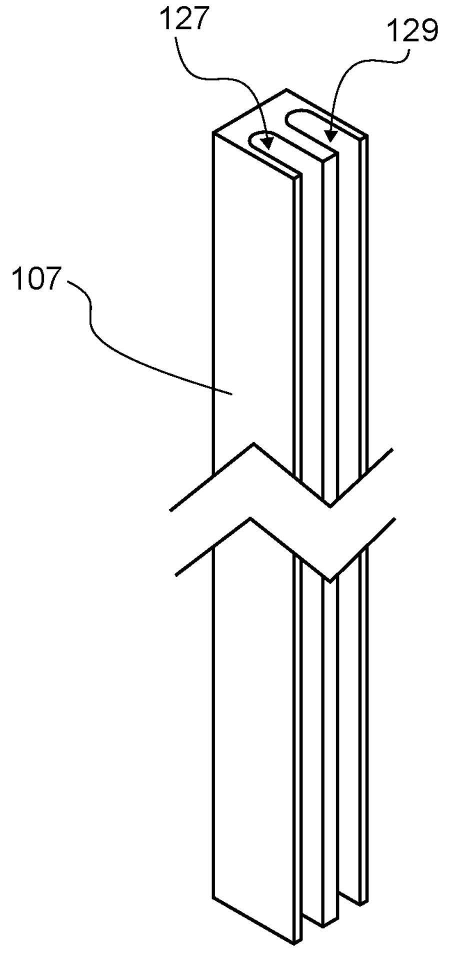
FIG. 3A is a perspective view of the first vertical column of the foldable wall system of FIG. 1.
Figure 3B:
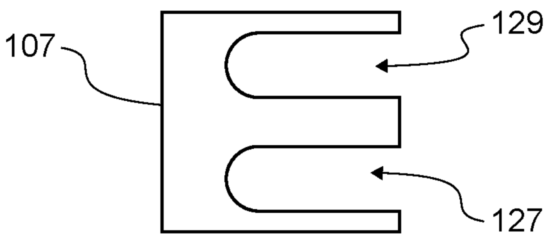
FIG. 3B is a top view of the first vertical column of FIG. 3A.

A closer view of first column 107 is shown in FIGS. 3A-3B. As discussed above, one or more tracks guide the plurality of panels between stored and deployed states. First portions of first and second tracks 123 and 125 were shown on an inside sidewall of housing 111 as shown in FIG. 2C. It is contemplated that first portion of first track 123 aligns with second portion of first track 127, and first portion of second track 125 aligns with second portion of second track 129 when housing 111 is mounted on first vertical column 107. In such embodiments, each of the plurality of panels can have first and second track elements (e.g., wheels), whereby the first track element travels along the first track and the second track element travels along the second track. Thus, the first track element travels along first portion of first track 123 and second portion of first track 127, and the second track element travels along first portion of second track 125 and second portion of second track 129 to store or deploy the plurality of track elements.

As discussed above, first portions of the third and fourth tracks can be disposed on an opposite sidewall of housing 111. In such embodiments, that the first portion of the third track can align with a second portion of the third track, and the first portion of the fourth track can align with a second portion of the fourth track when housing 111 is mounted on second vertical column 109. The second portions of the third and fourth tracks can be disposed on second vertical column 109 and have the same shape as second portions of first and second tracks 127 and 129. Furthermore, it is contemplated that each of the plurality of panels can have third and fourth track elements (e.g., wheels), whereby the third track element travels along the third track and the fourth track element travels along the fourth track. Thus, the third track element travels along the first and second portions of the third track, and the fourth track element travels along the first and second portions of the fourth track store or deploy the plurality of track elements.

As shown in FIGS. 3A, second portions of first and second tracks 127 and 129 are first and second grooves, respectively, that run along the height of first vertical column 107. The distance between second portions of first and second tracks 127 and 129 is such that first and second track elements of the plurality of panels travel within second portions of first and second tracks 127 and 129 to vertically stack the panels and form the wall or retract into housing 111, which has first portions of first and second tracks 123 and 125 to horizontally stack the panels within housing 111. It is contemplated that first and second vertical columns 107 and 109 can comprise various cross-sectional shapes (e.g., T-shaped, cross-shaped, etc.) so long as one or more tracks are provided to guide the plurality of panels between stored and deployed positions.

Figure 4A:
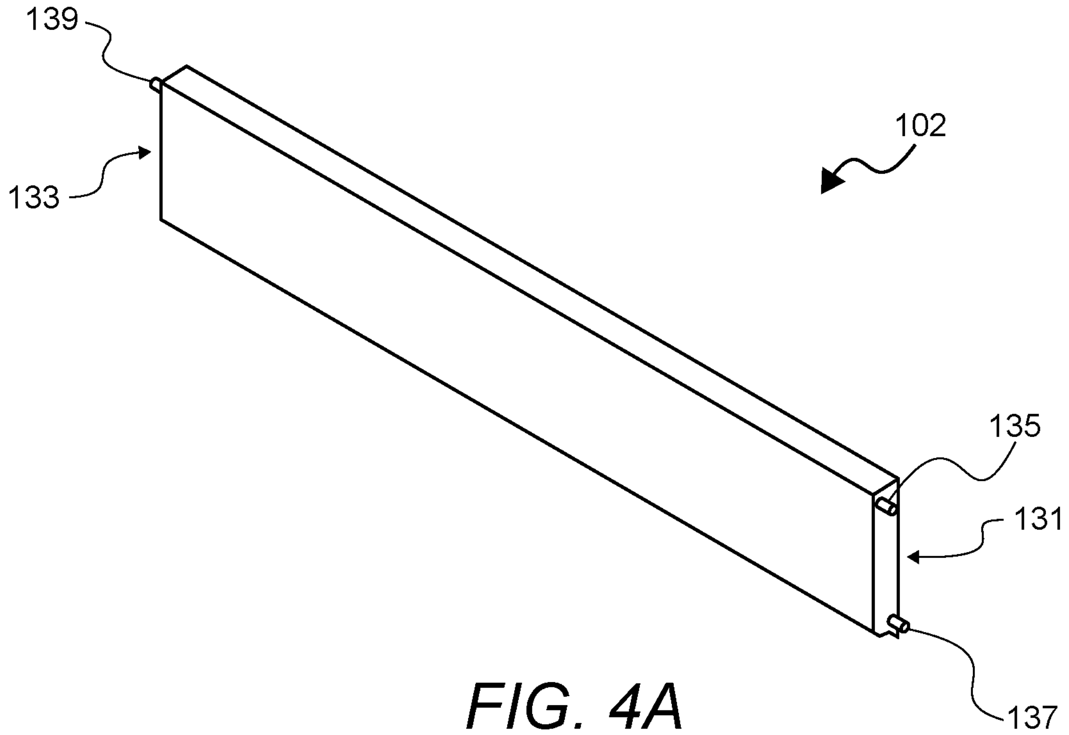
FIG. 4A is a perspective view of the top panel of the foldable wall system of FIG. 1.

One or more track elements travel within one or more tracks to store or deploy the plurality of panels as discussed above. FIG. 4A shows top panel 102 of foldable wall system 100. Top panel 102 comprises one or more track elements on a first end 131 and a second end 133 (e.g., two track elements on each end to travel along tracks on first and second vertical columns 107 and 109 and inside walls of housing 111). FIG. 4A shows a first track element 135 and a second track element 137 on first end 131 and a third track element 139 on second end 133. It is contemplated that second end 133 further comprises a fourth track element.

One or more of first, second, third, and the fourth track elements 135, 137, and 139 can be a wheel that slides or rotates within a track (e.g., a first track composed of first portion 123 and second portion 127). The wheel can comprise a thin shaft connected with a smooth sleeve, such that the sleeve freely rolls around the shaft. It is contemplated that the diameter of the sleeve is smaller than the width of the track in which the wheel travels. It is contemplated that the remaining panels (e.g., middle panel 103, bottom panel 101) have track elements disposed in the same locations as described for top panel 102.

Figures 4B, 4C, 4D:
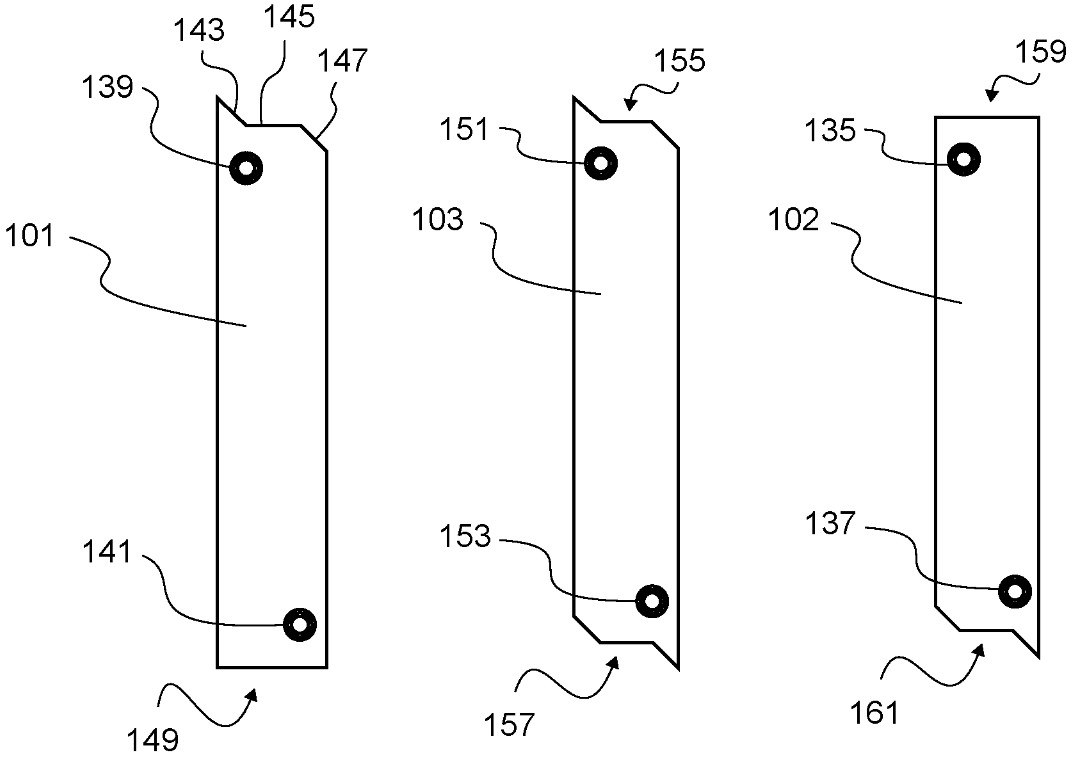
FIG. 4B is a side view of the bottom panel of the foldable wall system of FIG. 1.
FIG. 4C is a side view of the middle panel of the foldable wall system of FIG. 1.
FIG. 4D is a side view of the top panel of the foldable wall system of FIG. 1.

The plurality of panels can comprise three different types of panels that vary in shape on a top and/or a bottom as shown in FIGS. 4B-4D. FIG. 4B shows bottom panel 101 having a top with a raised edge 143 and a beveled edge 147 on opposite ends of a flat top 145. Bottom panel 101 has a flat bottom 149 that rests on bottom support 105. FIG. 4B also shows a first track element 139 and a second track element 141 of bottom panel 101. FIG. 4C shows middle panel 103 having a top 155 with a raised edge and a beveled edge between a flat top, and a bottom with the same configuration in reverse order (from left to right—beveled edge, flat surface, raised edge). FIG. 4C further shows a first track element 151 and a second track element 153 of middle panel. FIG. 4D shows top panel 102 having a flat top 159 and a bottom 161 having a beveled edge, a flat surface, and a raised edge. It should be appreciated that the shapes of the tops and bottoms of the panels are designed to help vertically stack the panels. Furthermore, the beveled edge on the tops of certain panels allow a stacked panel to be stored in a horizontal stacked configuration without interference because the beveled edge on a top of a panel does not block or otherwise restrict horizontal movement with a raised edge on a bottom of a stacked panel.

It is contemplated that one or more of the plurality of panels can comprise soundproofing layers and/or thermal insulation layers. Additionally, or alternatively, the one or more of the plurality of panels can include electric wires, water pipelines, and ventilation equipment (e.g., a ventilation duct). It is contemplated that the one or more panels can comprise pre-installed devices, such as audio speakers, air-conditioners, and smart home devices.

Figure 5:
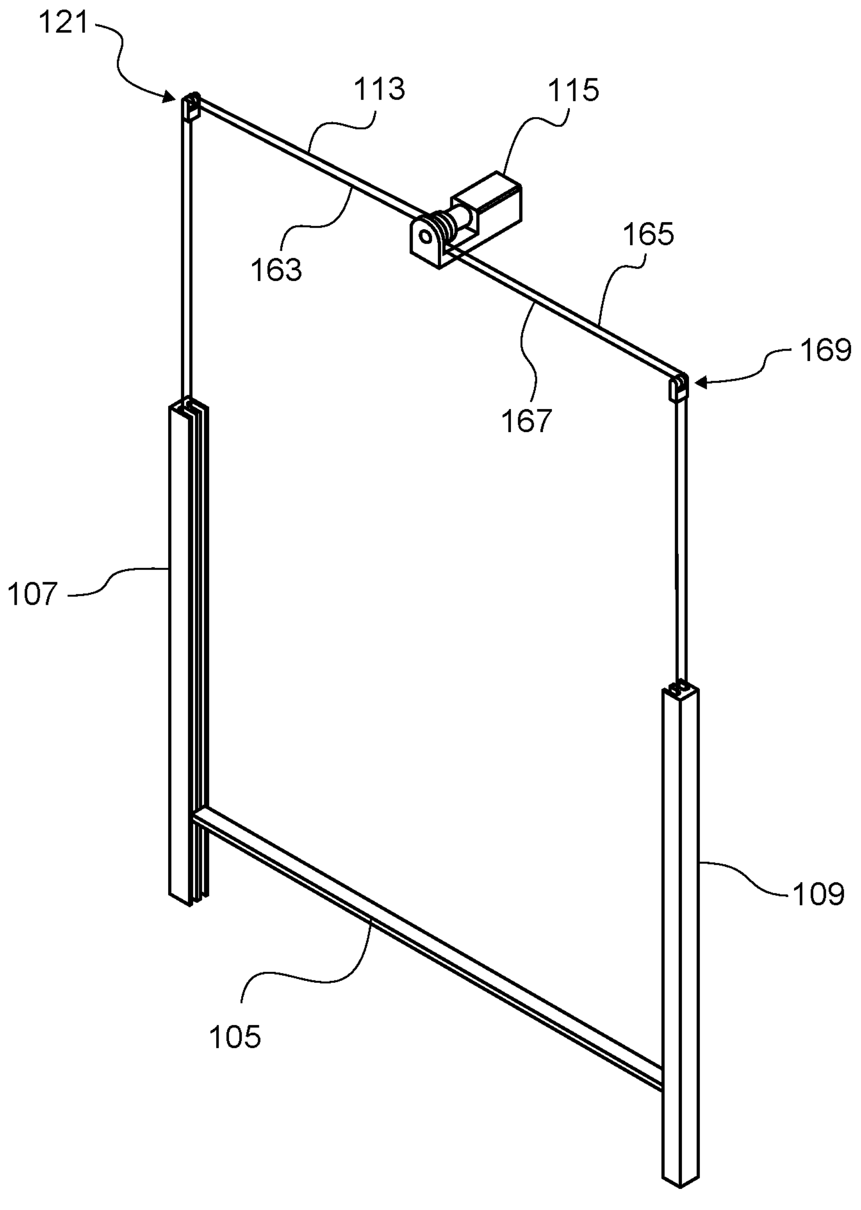
FIG. 5 is a perspective view of the cable system of the foldable wall system of FIG. 1.

FIG. 5 shows the motor-cable-pulley system of foldable wall system 100. Motor 115 is coupled to cable 113, a second cable 163, a third cable 165, and a fourth cable 167. Cable 113 and second cable 163 are coupled to a first end of bottom support 105, and third cable 165 and fourth cable 167 are coupled to a second end of bottom support 105. Pulleys 121 and a second set of pulleys 169 reorient cable 113, second cable 163, third cable 165, and fourth cable 167 from a horizontal orientation to a vertical orientation. As shown in FIG. 5, cable 113 and second cable 163 travel through second portions of first and second tracks 127 and 129 on first vertical column 107, and third cable 165 and fourth cable 167 travel through the second portions of the third and fourth tracks on second vertical column 109. It is contemplated that cable 113, second cable 163, third cable 165, and fourth cable 167 are coupled to motor 115, such that cable 113, second cable 163, third cable 165, and fourth cable 167 are retracted or deployed at the same rate to prevent uneven raising or lowering of bottom support 105.

Motor 115 provides enough torque to rotating shaft 117 for raising or lowering the plurality of panels stacked on bottom support 105. Cable 113, second cable 163, third cable 165, and fourth cable 167 are all connected to rotating shaft 117 of motor 115. Cable 113 and second cable 163 can connect to a first side of rotating shaft 117, and third cable 165 and fourth cable 167 connect to a second side of rotating shaft 117. For example, cable 113 and second cable 163 can be fixed to a top of rotating shaft 117, and third cable 165 and fourth cable 167 can be fixed to a bottom rotating shaft 117. It is contemplated that such a design will let the cables roll up at the same velocity when motor 115 starts spinning rotating shaft 117. Two cables from one side will be rotated in a clockwise direction and two cables on the other side will be rotated counterclockwise. Since they relate to the same shaft, the cables are rolled up at the same angular velocity.

Figure 6:
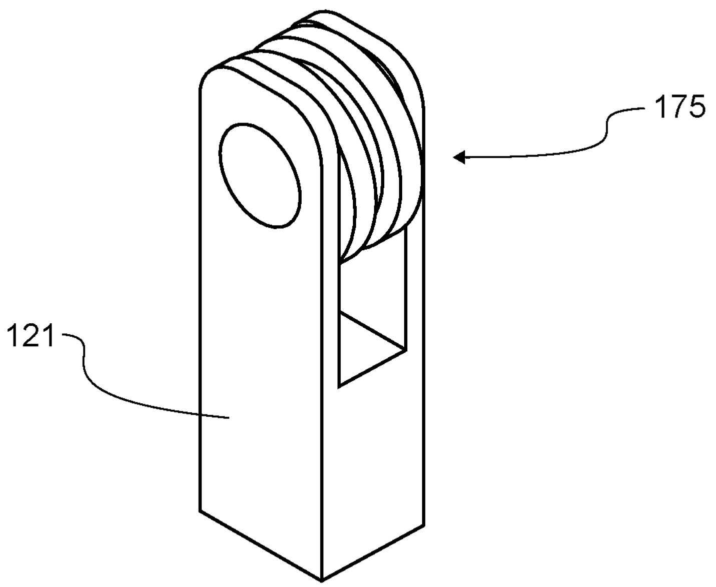
FIG. 6 is a perspective view of the pulley of the foldable wall system of FIG. 1.

FIG. 6 shows a pulley of pulleys 121. The pulley comprises of a support and a wheel 175 that freely rotates around a shaft. As discussed above, the pulley allows a cable to turn from a horizontal direction to a vertical direction and pass through housing 111 and one of first vertical column 107 or second vertical column 109.

Figure 7:
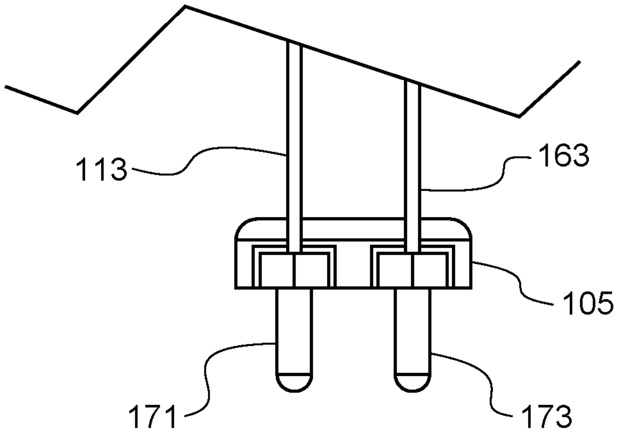
FIG. 7 is a side view of the bottom support of the foldable wall system of FIG. 1.

FIG. 7 shows a side view of bottom support 105 to illustrate cable 113 and second cable 163 connecting to bottom support 105. Cable 113 and second cable 163 are fixed to bottom support 105 via a first bolt 171 and a second bolt 173, respectively. It is contemplated that third cable 165 and fourth cable 167 can be similarly fixed to bottom support 105 on an opposite end of bottom support 105.

Although foldable wall system 100 shows a wall formed by five panels, it is contemplated that a wall can be formed by more or less panels. It should be appreciated that a system, such as foldable wall system 100, greatly reduces the time needed to construct a wall from possibly days to several minutes. Furthermore, such a design will allow people to change the room layout easily because the wall is foldable. What people need to do is just turn on the motor and let the plurality of panels can be stored or deployed to form the wall.

It should be further appreciated that the double track design ensures that the plurality of panels maintain a vertical orientation as they move between stored and deployed configurations (i.e., the panels do not tip over or rotate).

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

What is claimed is:

1. A wall system, comprising:

a first track;

a second track;

a first panel configured to move along the first and second tracks, wherein the first panel comprises a first track element that travels along the first track and a second track element that travels along the second track;

a second panel configured to move along the first and second tracks, wherein the second panel comprises a first track element that travels along the first track and a second track element that travels along the second track;

a bottom support coupled to a cable that is configured to raise and lower the bottom support;

wherein, as the bottom support is raised, the bottom support abuts the first or second panel to thereby apply a force that causes the first and second panels to move in a first direction along the first and second tracks;

wherein, as the bottom support is lowered, the first and second panels move in a second direction along the first and second tracks as the first or second panel abuts the bottom support; and wherein the first and second panels are horizontally stacked and abut one another when in a stored position and vertically stacked when in a deployed position.

2. The system of claim 1, wherein the first track element of the first panel is a wheel, and the second track element of the first panel is a second wheel.

3. The system of claim 2, wherein the first track element of the second panel is a wheel, and the second track element of the second panel is a second wheel.

4. The system of claim 1, further comprising first and second vertical columns, and wherein the first track is at least partially disposed on the first vertical column and the second track is at least partially disposed on the second vertical column.

5. The system of claim 4, further comprising a housing mounted on the first and second vertical columns, and wherein the first track is at least partially disposed on a first inside wall of the housing, and the second track is at least partially disposed on a second inside wall of the housing.

6. The system of claim 5, wherein the first track is vertical along the first vertical column and curves to substantially horizontal along the first inside wall of the housing.

7. The system of claim 6, wherein the first and second panels are configured to move along the first and second tracks (i) into the stored position within the housing in the first direction, and (ii) into the deployed position in the second direction.

8. The system of claim 1, further comprising a motor having a rotating shaft, and wherein the cable is coupled to the rotating shaft that is configured to raise and lower the cable to thereby raise and lower the bottom support.

9. The system of claim 8, further comprising a second cable coupled to the rotating shaft and the bottom support, and wherein the rotating shaft is configured to raise and lower the cable and the second cable to thereby raise and lower the bottom support.

10. The system of claim 9, wherein the cable is coupled to a first end of the bottom support and the second cable is coupled to a second end of the bottom support.

11. The system of claim 9, wherein the first cable is at least partially disposed within the first track, and the second cable is at least partially disposed within the second track.

12. A wall system, comprising:
- a first vertical column;
- a second vertical column;
- a housing mounted on the first and second vertical columns;
- a first track along the first vertical column and a first inside wall of the housing;
- a second track along the second vertical column and a second inside wall of the housing;
- a plurality of panels that each comprise (i) a first track element that travels along the first track and (ii) a second track element that travels along the second track;
- wherein each of the plurality of panels, via the first track element and the second track element, are configured to (i) travel to a deployed state in which the plurality of panels are vertically stacked to form a wall, and (ii) travel to a retracted state in which the plurality of panels are horizontally stacked within the housing.

13. The system of claim 12, wherein the first and second track elements of each of the plurality of panels are first and second wheels, respectively.

14. The system of claim 12, further comprising a third track along the first vertical column and the first inside wall of the housing.

15. The system of claim 14, wherein each of the plurality of panels comprises a third track element that travels along the third track.

16. The system of claim 12, wherein the first track is a slot along the first vertical column and the first inside wall of the housing.

17. The system of claim 12, further comprising a bottom support beneath the plurality of panels, and wherein the bottom support is coupled to a motor that raises and lowers the bottom support to thereby move the plurality of panels between the deployed state and the retracted state.

18. The system of claim 17, further comprising a first cable that couples the bottom support and the motor.

19. The system of claim 18, wherein the first cable is at least partially disposed in one or more of the first track and the second track.

20. The system of claim 17, further comprising a second cable that couples the bottom support and the motor, and wherein the first cable is at least partially disposed within the first track and the second cable is at least partially disposed within the second track.

* * * * *